(No Model.)
B. D. SPILMAN.
HAY LOADER.
No. 341,179.     Fig. 1.     Patented May 4, 1886.
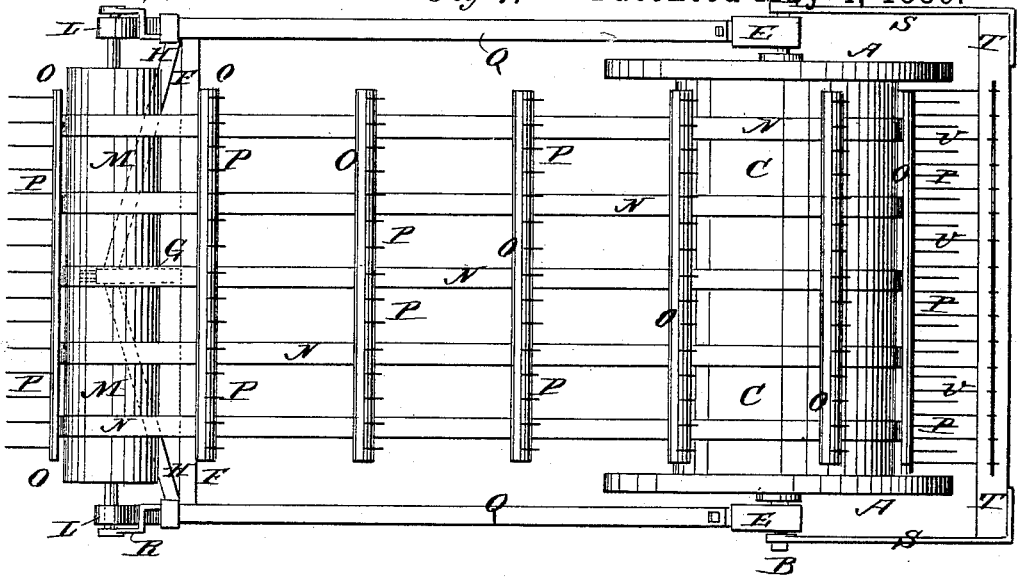
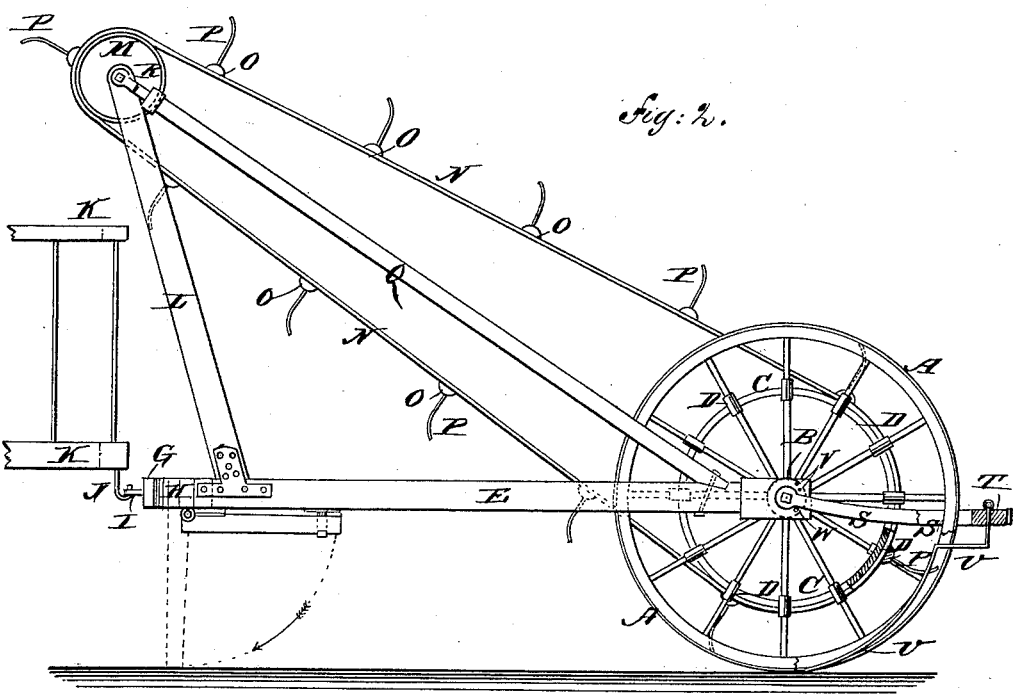
Fig. 2.
WITNESSES:
Donn Twitchell
C. Sedgwick
INVENTOR:
B. D. Spilman
BY Munn & Co.
ATTORNEYS.

United States Patent Office.

BALDWIN D. SPILMAN, OF FORT MEADE, DAKOTA TERRITORY, ASSIGNOR TO HIMSELF, ANDREW G. JACKSON, JOHN W. WILKINSON, AND GEORGE H. CAMERON, ALL OF SAME PLACE.

HAY-LOADER.

SPECIFICATION forming part of Letters Patent No. 341,179, dated May 4, 1886.

Application filed June 16, 1885. Serial No. 168,881. (No model.)

*To all whom it may concern:*

Be it known that I, BALDWIN DAY SPILMAN, residing at Fort Meade, in the county of Lawrence and Territory of Dakota, have invented a new and useful Improvement in Hay-Loaders, of which the following is a full, clear, and exact description.

Reference is to be had to the accompanying drawings, forming a part of this specification, in which similar letters of reference indicate corresponding parts in both the figures.

Figure 1 is a plan view of one of my improved hay-loaders. Fig. 2 is a side elevation of the same, partly in section, and showing a part of a hay-rack.

The object of this invention is to provide hay-loaders constructed in such a manner as to collect the hay from the ground, raise it to a suitable height, and discharge it upon the hay-rack of a wagon or cart, and which shall be simple in construction and reliable in operation.

The invention consists in the construction and combination of the various parts of the hay-loader, as will be hereinafter fully described, and then claimed.

A are the wheels, which are rigidly attached to the axle B, and to which or to the said axle is attached a large drum or cylinder, C.

In the drawings the cylinder C is represented as being secured to the spokes of the wheels A by socket-clamps D, but the means by which the connection is made is immaterial. The end parts of the axle B revolve in bearings in the side bars, E, near their rear ends. The forward ends of the side bars, E, are connected by a cross-bar, F, to the center of which is attached a short draw-bar, G. The draw-bar G is strengthened in position by the braces H, attached to it and to the end parts of the cross-bar F. To the forward end of the draw-bar G is attached a staple, eyebolt, clevis, ring, or other suitable device, I, to engage with a hook, J, attached to the rear end of a hay-rack, K, or the rear part of the running-gear of a wagon.

To the forward ends of the side bars, E, are attached the lower ends of standards L, which incline forward, so as to bring their upper ends over the rear part of the hay-rack K. To the upper ends of the standards L are journaled the ends of a small cylinder, M, around which and around the cylinder C pass a number of endless belts, N.

To the endless belts N are attached cross-bars O, to which are attached upwardly-projecting teeth P, having their outer parts curved forward slightly, so that they will take hold of the hay more surely, carry it up the elevator more securely, and discharge it more readily at the upper end of the said elevator.

The standards L are strengthened against the draft-strain of the endless belts N by the brace-bars Q, the lower ends of which are attached to the rear parts of the side bars, E. The upper ends of the brace-bars Q are connected with the journals of the small cylinder M or the upper ends of the standards L by metal straps R, or other suitable means.

To the ends of the axle B are pivoted the forward ends of two bars, S, which extend back a little beyond the rims of the wheels A, and their rear ends are bent inward, and are attached to the rear sides of the ends of the cross-bar T.

To the cross-bar T are attached the rear ends of rake-teeth U in such positions that the teeth P of the endless belts N will pass between the said teeth U as the said belts are carried forward by the revolution of the cylinder C. The rake-teeth, at a little distance below the cross-bar T, are bent forward, and at points between the rims of the wheels A and the outer surface of the cylinder C are bent downward, and are curved forward and downward until their forward ends are in contact with or near the ground directly beneath or a little in front of the axis of the wheels A and cylinder C, the curve being such that the space between the said teeth U and the surface of the cylinder C will gradually decrease in width from the forward ends of the said teeth to the shoulders at the upper ends of their curved parts, so as to slightly pack the hay as it is carried up the said teeth U by the teeth P.

In the rear ends of the side bars, E, are formed several holes, V, to receive pins W, upon which the pivoted bars S rest, so that by adjusting the said pins W the said bars S will be adjusted to bring their rear ends, and consequently the forward ends of the rake-teeth U, closer to or farther from the ground. With this construction, as the machine is drawn forward the rake-teeth U collect the hay and the carrier-teeth P carry it up between the rake-teeth U and the cylinder C, over the said cylinder C up to and over the cylinder M, and discharge it into the hay-rack.

If desired, the brace-bars Q can be provided with a light frame extending upward as high as the points of the teeth, to prevent the hay from being blown off the elevator by the wind. The forward end of the frame E F is provided with a hinged leg or other suitable support, to support the forward end of the machine in a raised position when detached from the hay-rack, and which is turned back out of the way when the machine is being used.

Having thus fully described my invention, I claim as new and desire to secure by Letters Patent—

The combination, with the frame E, having the upright frame L Q F, supporting in an overhanging position the cylinder M, of the endless toothed belt encompassing said cylinder, and a second cylinder, C, fast upon the wheels A, and the rake-head T, carrying the rake-teeth U, and provided with arms or bars S, pivoted to the rear ends of the side bars, E, of the frame, said ends of the bars E having apertures V, which receive adjusting-pins W, upon which said arms or bars S rest, substantially as and for the purpose set forth.

BALDWIN D. SPILMAN.

Witnesses:
J. H. G. WILCOX,
W. J. DENT.